Patented Dec. 3, 1940

2,223,464

UNITED STATES PATENT OFFICE 2,223,464

STABILIZED YEAST

Alfred S. Schultz, Bronx, and Charles N. Frey, Scarsdale, N. Y., assignors to Standard Brands Incorporated, New York, N. Y., a corporation of Delaware No Drawing. Application June 26, 1937, Serial No. 150,536

5 Claims. (Cl. 99—96)

The invention relates to a procedure for the production of a comestible, and more particularly to a method whereby the qualities of yeast may be enhanced.

It is an object of the invention to provide a procedure for the preparation of a yeast which comprises combining yeast with a fatty acid derivative of a higher polyhydric alcohol.

A further object of the invention is the provision of a yeast containing as an ingredient either initially, finally, or both, a fatty acid derivative of a polyhydric alcohol containing at least four carbon atoms.

A more particular object of the invention is to provide a process for the preparation of an improved yeast, in which a lauric acid derivative, especially of a polyhydric alcohol, is utilized.

An additional object of the invention is to provide a method for improving the cutting qualities and color of yeast through the incorporation therewith of a fatty acid derivative of a polyhydric alcohol containing at least four carbon atoms, such as a lauric acid derivative of sorbitol.

A specific object of the invention is the provision of a yeast containing a lauric acid derivative of a polyhydric alcohol, for example, a laurate of sorbitol.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

In the practice of the invention, yeast of improved qualities may be prepared through combining therewith a fatty acid derivative or ester such as a partial ester of a polyhydric alcohol, especially one having at least four carbon atoms. Combination of the fatty acid partial ester of a polyhydric alcohol with the yeast may be effected during various stages of its manufacture, or after the manufacture has been completed and as a finishing feature prior to placement upon the market. Thus, a lauric acid derivative of a polyhydric alcohol, as a laurate of sorbitol, may be admixed before, during, or after the growing of the yeast.

Preferably, it is combined with yeast after the yeast has been freed from a considerable part of the wort or mother liquor, for example, as the yeast comes from the filter press. It is necessary only to introduce the desired amount of yeast and derivative into a mixer and continue operation until an effective distribution of the derivative has taken place. Thus, a laurate of sorbitol may be incorporated with yeast as it comes from the separators in the cream condition, or after the yeast has been filter pressed and is being prepared for packaging. The fatty acids utilized preferably are lauric acid and higher fatty acids, as palmitic, stearic and oleic, and the polyhydric alcohol may be a glycol, as diethylene, triethylene and dipropylene glycols, or a carbohydrate alcohol as sorbitol, mannitol, erythrol and the like.

The combination with yeast may be and preferably is brought about by admixture with the yeast after it has been filter pressed, and satisfactory results have been obtained through the use of from 0.12 to about 1% of the fatty acid derivative. A yeast so produced is thereby stabilized and possesses improved cutting qualities and hence may be carried through the various operations attending the cutting and wrapping with greater facility.

Moreover, it is of improved color, i. e., whiter than without the incorporation of a derivative. Preferably, a lauric acid derivative of a polyhydric alcohol is utilized. Especially, the alcohol is a carbohydrate alcohol and specifically one containing six carbon atoms, as sorbitol, mannitol, and the like. We have found that the mono- di- and/or trilaurate of sorbitol are particularly well adapted for incorporation in yeast in order to improve the cutting and to give a whiter color, and there appears also to be an increase in the water holding capacity of the yeast, with a resultant cake which is firm and of lighter color.

The procedure accordingly leads to the obtainment of a yeast having improved qualities. It is considered that the compound of distinct effectiveness is a dilaurate of sorbitol, as a dilaurate-disorbitol having the probable formula

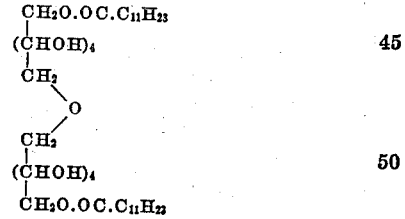

The fatty acid derivatives may be utilized either singly, or in compatible combinations, as the di- and trilaurates of sorbitol.

While the exact manner in which the fatty acid is combined with the higher polyhydric alcohols is not definitely known, it is believed that the acid is esterified. This is deemed to be true in the case of the lauric acid derivatives, and also for the other fatty acids that may be employed, as palmitic, stearic and oleic. In addition to the lauric acid esters of the polyhydric alcohols, other esters of this acid may be introduced, as the simple esters having the formula $C_{11}H_{23}COOR$, in which R represents a hydrocarbon radical, which may be saturated or unsaturated, and specifically propylene laurate having the probable formula $$C_{11}H_{23}COO.CH=CH.CH_3$$

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. As an article of manufacture, a yeast containing a lauric acid partial ester of a polyhydric alcohol containing at least four carbon atoms as a stabilizing agent for said yeast.

2. As an article of manufacture, a yeast containing a fatty acid partial ester of a polyhydric alcohol having six carbon atoms as a stabilizing agent for said yeast.

3. As an article of manufacture, a yeast containing a lauric acid partial ester for sorbitol as a stabilizing agent for said yeast.

4. As an article of manufacture a yeast associated with a fatty acid partial ester of a polyhydric alcohol having at least four carbon atoms and at least four hydroxyl groups as a stabilizing agent for said yeast.

5. As an article of manufacture a yeast associated with a dilaurate-disorbitol as a stabilizing agent for said yeast.

ALFRED S. SCHULTZ.
CHARLES N. FREY.